United States Patent [19]

Spak

[11] Patent Number: 4,969,660
[45] Date of Patent: Nov. 13, 1990

[54] FOLDABLE LUGGAGE CARRIER

[76] Inventor: Jay Spak, 514 Morse St. No.40, Oceanside, Calif. 92054

[21] Appl. No.: 509,990

[22] Filed: Mar. 29, 1990

Related U.S. Application Data

[63] Continuation-in-part of Ser. No. 381,062, Jul. 17, 1989, abandoned.

[51] Int. Cl.⁵ .................................................. B62B 1/04
[52] U.S. Cl. ..................................... 280/646; 280/655; 280/47.29; 74/96; 74/569; 403/61
[58] Field of Search .................. 280/37, 40, 639, 646, 280/654, 655, 47.29; 74/96, 569; 403/61, 116

[56] References Cited

U.S. PATENT DOCUMENTS

| 3,043,603 | 6/1959 | Major, Sr. | 280/40 |
| 3,197,226 | 12/1963 | Erlinder | 280/36 |
| 3,241,852 | 7/1964 | Muller et al. | 280/40 |
| 3,947,054 | 3/1976 | Hall | 280/36 |
| 4,037,858 | 7/1977 | Adams | 280/626 |
| 4,062,565 | 12/1977 | Holtz | 280/655 |
| 4,299,403 | 11/1981 | Brewer | 280/47 |
| 4,315,632 | 2/1982 | Taylor | 280/47.29 X |
| 4,754,985 | 7/1988 | Im et al. | 280/47.29 X |

Primary Examiner—Charles A. Marmor
Assistant Examiner—Michael Mar
Attorney, Agent, or Firm—Lewis E. Massie

[57] ABSTRACT

A light weight, foldable, luggage carrier capable of being folded to a flat package storable beneath the seat of an airplane or a train. The carrier having larger than normal diameter wheels whose axis rotates inwardly between the frame members when the luggage support frame is raised to the closed or stored position. This conversion of the carrier from the open to the closed position can be accomplished by the use of one hand.

1 Claim, 3 Drawing Sheets

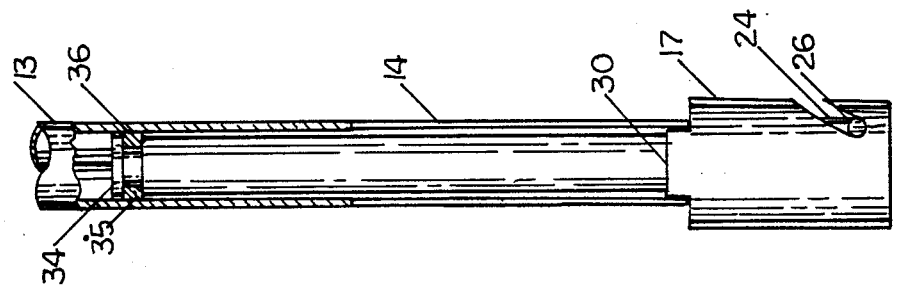
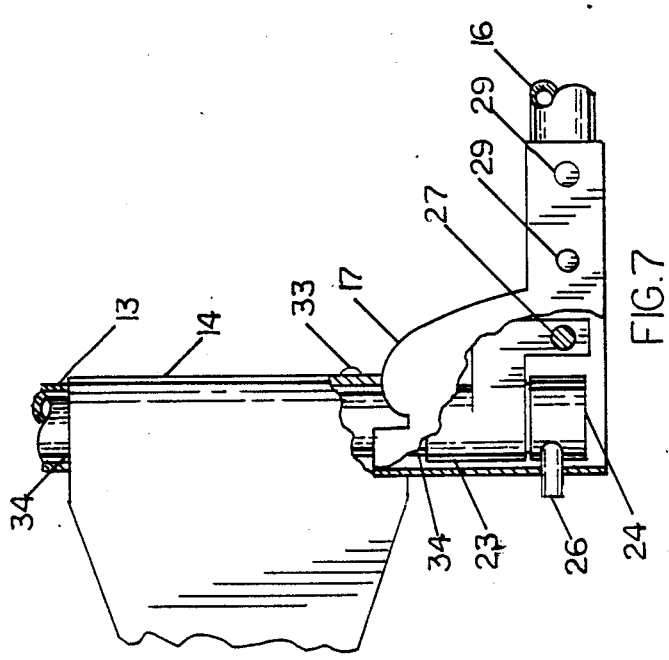
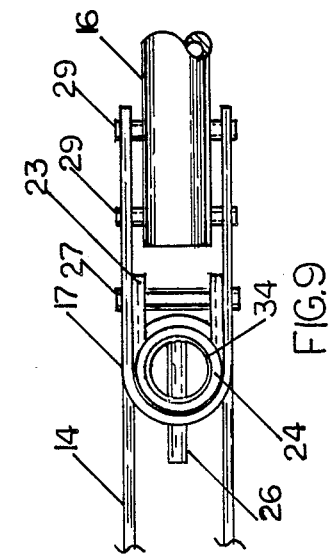
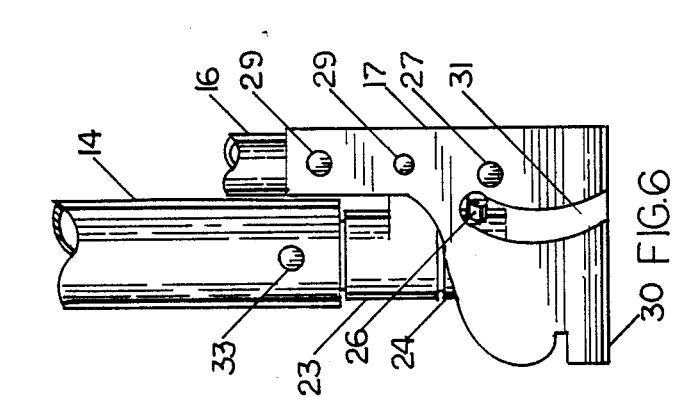
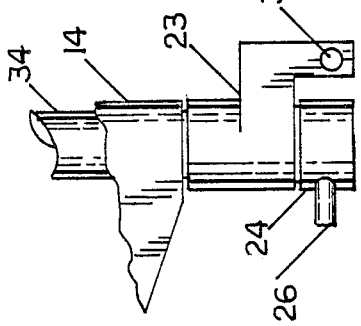

FOLDABLE LUGGAGE CARRIER

This is a continuation-in-part of U.S. patent application Ser. No. 07,381,062 filed 07/17/89, now abandoned.

BACKGROUND OF THE INVENTION

1. Field of the Invention

This invention relates to a hand-truck and more particularly to a hand-truck that when empty can be folded into a compact unit flat enough to be stored beneath the seat of an aircraft or train.

2. Description of the Prior Art

U.S. Pat. No. 3,947,054 Hall, describes a folding luggage carrier, with a folding handle and small wheels, that easily folds for storage beneath an aircraft passenger seat.

U.S. Pat. No. 4,299,403 Brewer et al describes a wheeled baggage carrier with foldable handle and foldable platform of truss-like configuration. U.S. Pat. No. 4,062,565 Holtz, describes a collapsible baggage cart as tubular configuration with a foldable handle and a foldable platform. The U.S. Pat. No. 3,043,603 Major, Sr., describes a hand-truck with pivoted wheel supports.

SUMMARY OF THE INVENTION

The principal objectives of the instant invention is to provide a luggage carrier foldable into a flat configuration that will fit beneath the seat of a passenger aircraft. The luggage carrier capable of being opened for use and locked in the open position by folding down the luggage platform. The limiting factor in obtaining a flat package for many luggage carriers is the diameter of the wheels, thus necessitating the use of impractical small wheels. The instant invention provides pivoted wheel support, allowing the wheels to swing inwardly parallel to the luggage carrier frame. This arrangement permits the use of a larger wheel diameter, for traversing uneven surfaces.

A second limiting factor in obtaining a flat package in the configuration of the handle hinge assembly. The instant invention describes a hinge assembly of the same outside dimensions as the carrier frame member.

Luggage carriers currently available having pivoted wheel supports and foldable platforms require the use of two hands in order to swing each wheel outwardly and to fold down the platform. The instant invention utilizes a motion conversion device coupled between the platform hinge and the pivoted wheel support that simultaneously rotates the wheels as the platform is lowered into position by one hand.

The instant invention describes a luggage carrier with a tubular substantially rectangular basic frame with a pair of wheels rotatable around the vertical axis attached to two adjacent corners. A second frame of similar construction is hinged to the top of the basic frame so as to be capable of extending the basic frame into a coplanar position. A rectangular tubular frame attached to the basic frame near the wheels supports luggage stacked onto the carrier. The rotatable wheel supports which are angularly movable from an extended position to a folded position are mounted on the lower end of the main support structure. The wheel supports are rotatable around the tubular support structure by means of a vertical slot engaging an extended section extending upwardly from the platform hinge which rotates around a diametric pin extending from the tubular support.

BRIEF DESCRIPTION OF THE DRAWINGS

FIG. 6 is a detailed side view of the rotary motion conversion bracket in the folded configuration;
FIG. 7 is a detailed side view of the rotary motion conversion bracket in the open configuration;
FIG. 8 is a detailed view of the motion conversion rotary hub;
FIG. 9 is a bottom view of the rotary motion conversion bracket;
FIG. 12 is an end view of the rotary motion conversion bracket.

DETAILED DESCRIPTION OF THE PREFERRED EMBODIMENTS

Figure 1:
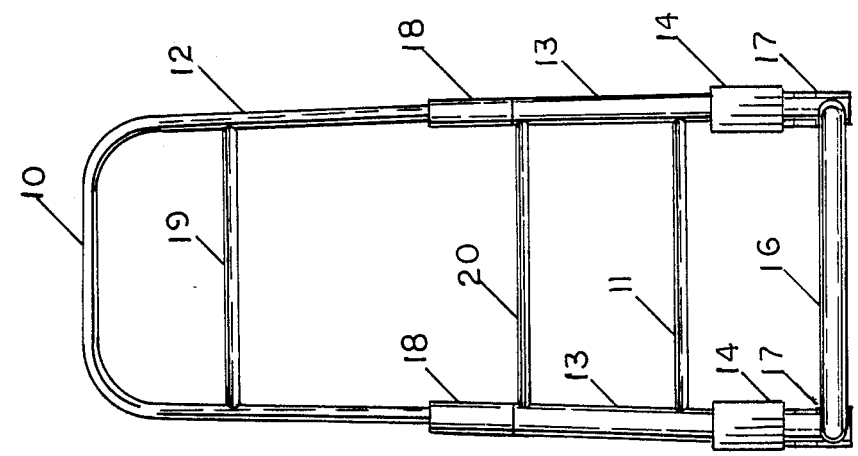
FIG. 1 is a front view of the foldable luggage carrier.

Referring to FIG. 1 the foldable luggage carrier 10 is shown in a front view with the second or upper frame structure 12 with horizontal brace 19 hinged to the lower basic frame structure 13 with horizontal braces 20 and 11. The slidable hinge lock tube 18 is shown in the locked position. Rotatable around the tubular structure 13 are the wheel support brackets 14 with luggage support frame 16 hinged vertically to the tubular structure 13 by rotary motion conversion bracket 17.

Figure 2:
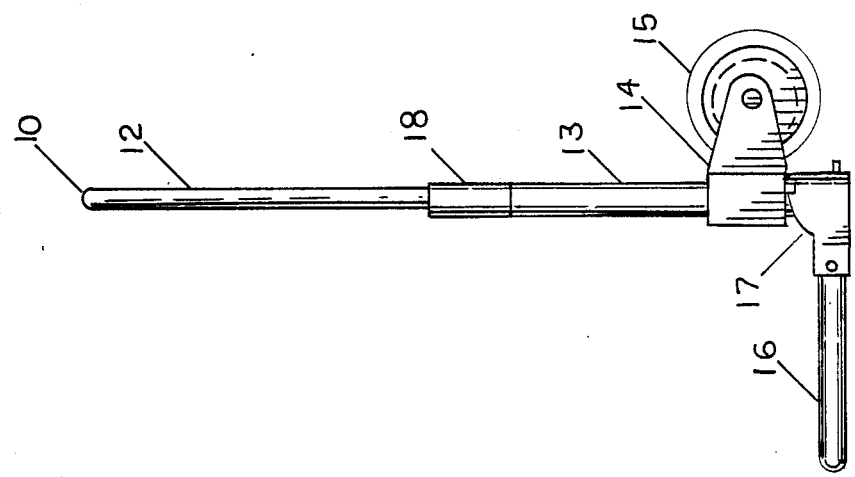
FIG. 2 is a right side view of the foldable luggage carrier.

The side view of FIG. 2 shows the luggage carrier 10 with upper frame 12, the hinge lock tube 18, lower basic frame 13 with rotatable wheel support bracket 14 supporting the wheel 15. The rotary motion conversion bracket 17 is shown with attached luggage support frame 16.

Figure 3:
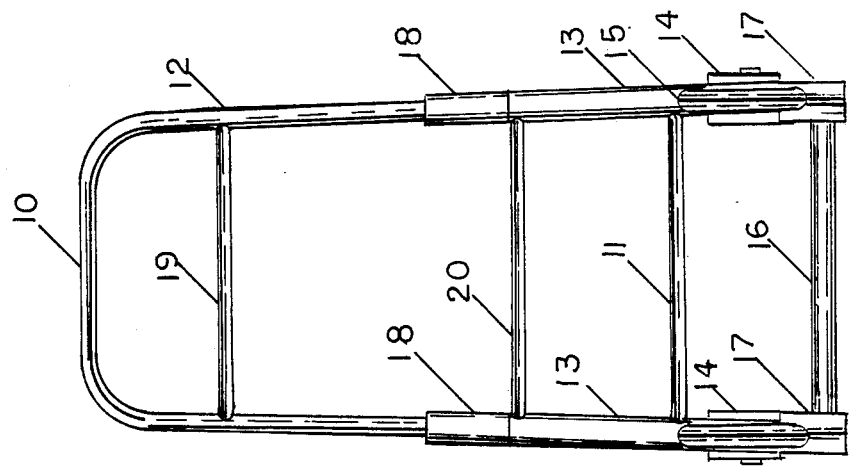
FIG. 3 is a back view of the foldable luggage carrier.

The rear view of FIG. 3 shows the luggage carrier 10 with the upper frame structure 12, with horizontal brace 19, hinged to the lower tubular vertical support structure 13 with horizontal braces 20 and 11. The hinge covered by slidable lock tube 18 is shown in the locked position. Rotatable around the tubular structure 13 are the wheel support brackets 14 with the wheels 15, the rotary motion conversion bracket 17 and the luggage arm 16.

Figures 4, 5:
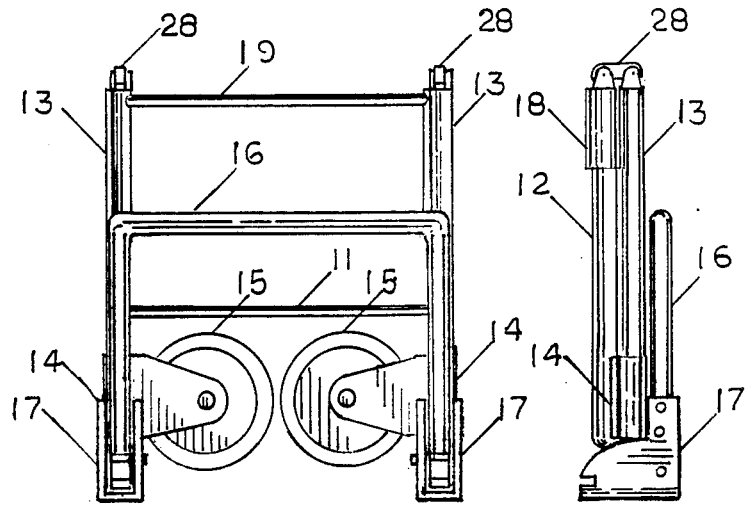
FIG. 4 is a front view of the foldable luggage carrier in the folded configuration.
FIG. 5 is a left side view of the foldable luggage carrier in the folded configuration

A front view of the foldable luggage carrier 10 is shown in FIG. 4 with the carrier in the folded configuration. The wheels 15 and support brackets 14 are rotated inwardly and the luggage support arm 16 folded upwards into the vertical position. The upper frame structure 12, with horizontal brace 19, is folded downwards by means of hinges 28 coupling the upper frame to the lower frame and horizontal braces 10 and 11. The rotary motion conversion bracket 17 is shown in the folded position:

FIG. 5 is a left side view of FIG. 4 showing the upper frame structure 12 and the lower frames structure 13 with coupling hinges 28 and hinge locking tube 18 raised to permit hinge operation. The luggage support frame 16 is shown in the upward position, the wheel support bracket 14 is shown with the rotary motion converter bracket 17.

FIG. 6 is a detailed view of the rotary motion conversion bracket 17 in the folded position. The bracket 17 rotatable around the hinge pin 27 has a cam slot 31 which engages the radial pin 26 extending from the hub 24 and which serves to fasten the hub 24 to the rotatable tube frame member 34. The hinge pin 27 extends through orifices in the bracket 23 which is rotatable around the rotatable tube frame member 34. The wheel support bracket 14 is fastened to the rotatable tube frame member 34 by rivets 33 or other fastened to the rotatable tube frame member 34 by rivets 33 or other suitable means. The luggage support bracket 16 is shown extending from the bracket 17 with the position locking protrusion 30.

FIG. 7 is a detailed view of the rotary motion conversion apparatus 17 rotated around the hinge pin 27 with the cam slot 31 engaging the radial pin 26 to rotate the hub 24, the rotatable tube frame member 34 and the wheel support bracket 14 to extend the wheels into the open position and engaging the protrusion 30 between the side walls of the bracket 14.

FIG. 8 is a detailed view if the pin support orifice 32 in the bracket 23, the hub 24 with radial pin 26 and rotatable tube frame member 34.

FIG. 9 is a bottom view of the rotary motion conversion bracket showing the wheel support bracket 14, the hub 24, the rotatable tube frame member 34, the radial pin 26 and the luggage support frame 16 with fastening rivets 29.

Figure 10:
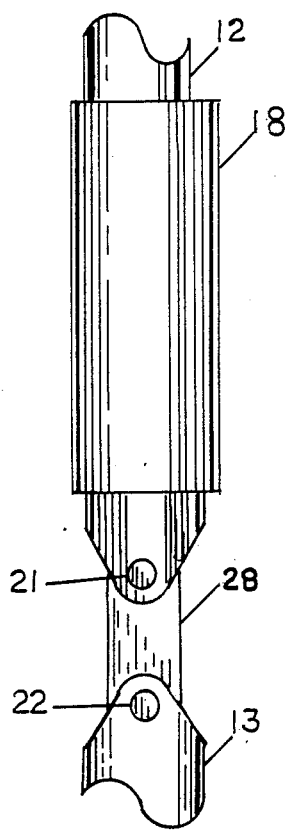
FIG. 10 is a detailed front view of the handle hinge.

FIG. 10 shows a side view of the hinge 28 with clevis 21 in the top structure 12 and the bottom basic frame member 13 with the clevis 22. The slidable lock tube 18 is shown in the upper or unlocked position.

Figure 11:
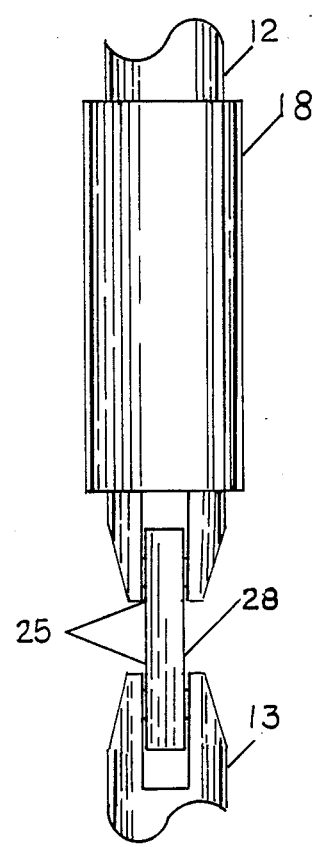
FIG. 11 is a detailed side view of the handle hinge.

FIG. 11 is a front view of the hinge 28 with upper portion 25 in the clevis 21 and the lower portion 25 in the clevis 22 in the basic frame member 12.

FIG. 12 is a left end view of FIG. 7 showing the bracket 17 with protrusion 30 engaging the side walls of the wheel support bracket 14 with radial pin 26 engaging the cam slot 31, the rotatable tube frame member 34 with flange 35 supported by circular slot 35 and ring 36.

In use, rotating the luggage frame and bracket clockwise, or downwardly, around the hinge pin 27 rotates cam slot 31 to rotate radial pin 26 with the hub 24 and the rotatable tube member 34 clockwise around the vertical axis of the basic frame member 13. The wheel support bracket fastened to the rotatable tube member 34 is rotated clockwise with the hub 24 rotating the wheel support bracket 90 degrees to engage the protrusion 30 in the space between the side walls of the wheel support bracket 14.

I claim:
1. A foldable luggage carrier comprising:
a lower frame having a pair of spaced vertical tubular frame members and a plurality of horizontal braces interconnecting the tubular frame members;
an upper frame of tubular construction and having an inverted U-shaped configuration;
hinge means for pivotally connecting said lower frame to said upper frame, including clevises located at the lower ends of lower frame, and linking members interconnecting the clevises of said upper frame to respective clevises of said lower frame;
tubular locking members slidable over said hinge means and adjacent portions of said upper and lower frames for selectively locking said upper and lower frames in an extended operable position;
a U-shaped luggage support frame of tubular construction having a pair of spaced legs and a central portion;
a rotary motion conversion bracket pivotally attached to a lower end of each said vertical tubular frame member, each said rotary motion conversion bracket having a U-shaped configuration with a pair of spaced legs and a curved central portion, a free end of each leg of said luggage support frame being rigidly connected between the spaced legs of a respective one of said rotary motion conversion brackets, and a curved cam slot formed in each said rotary motion conversion bracket;
a wheel support bracket pivotally attached to a lower portion of each said vertical tubular frame member, each said wheel support bracket having a U-shaped configuration with a pair of spaced legs and a curved central portion, said central portion of said wheel support bracket encircling said vertical tubular frame member, and a wheel rotatably supported between said pair of spaced legs of each said wheel support bracket; and
a rotatable hub extending axially through each said vertical tubular frame member, each said wheel support bracket being secured to a respective hub for rotation therewith, each said hub having a lower portion extending into a respective one of said rotary motion conversion brackets and a pin extending radially outwardly from said lower portion, said pin extending through said cam slot of said rotary motion conversion bracket for causing rotary motion of said hub, with said wheel support bracket attached thereto, in response to pivotal movement of said luggage support frame relative to said lower frame.

* * * * *